Patented Mar. 20, 1928.

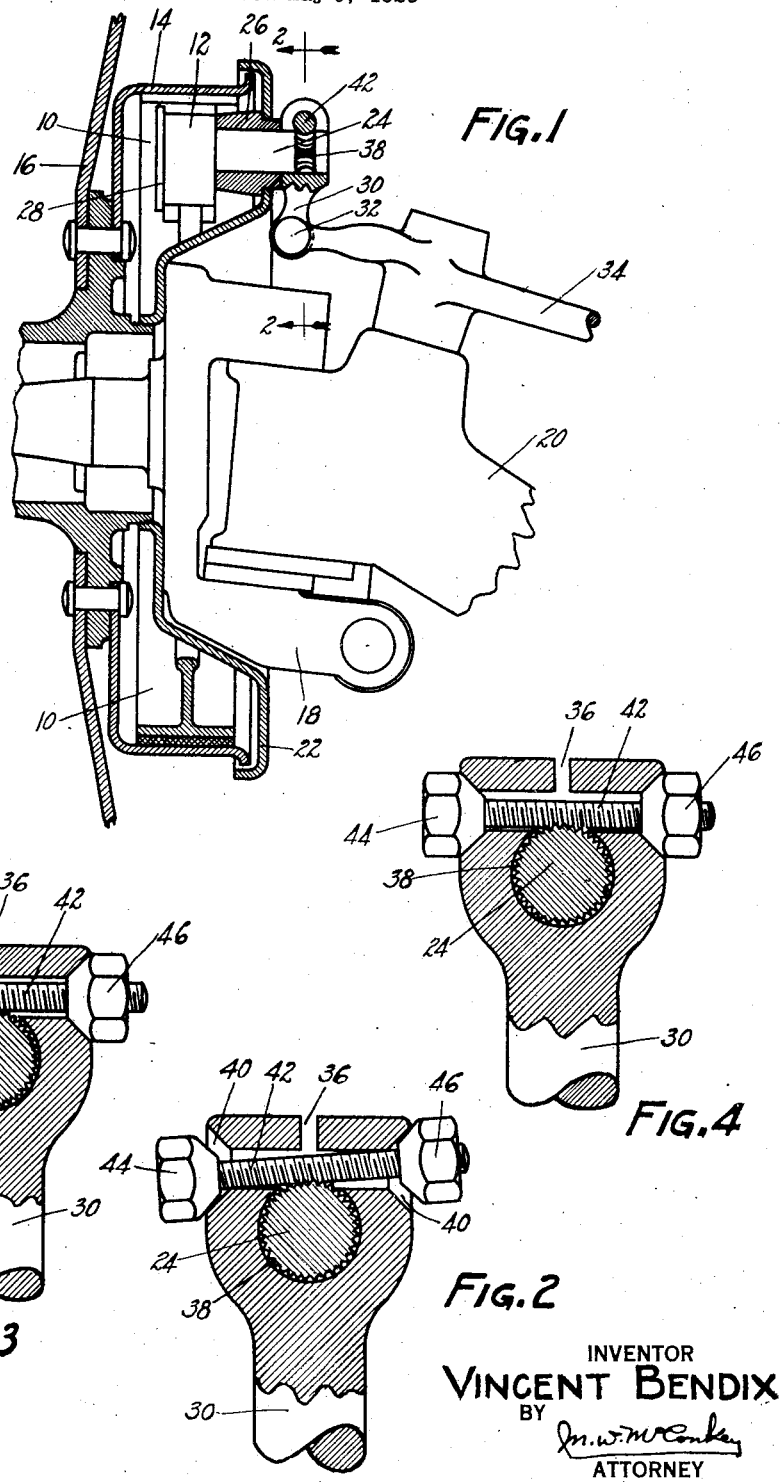

1,663,290

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

LEVER MOUNTING.

Application filed May 3, 1926. Serial No. 106,307.

This invention relates to mounting levers on shafts or the like, and more particularly to novel means for adjusting the levers angularly of their shafts, and is illustrated as embodied in a brake-applying lever adjustably mounted on the camshaft of an automobile brake.

An important feature of the invention relates to providing in the hub of the lever a clamping bolt or other member meshing with worm teeth cut in the shaft, or an equivalent gear part on the shaft, and which is provided with novel means for drawing the bolt tightly against the shaft and at the same time clamping it in adjusted position. If desired, the hub of the lever may be split, in which case the tightening means may be arranged to contract the hub to clamp it on the shaft.

In one desirable arrangement, there are conical countersunk depressions at the ends of the bore containing the bolt, the bolt preferably being considerably smaller than its bore, and the depressions contain parts (such as the head of the bolt and a nut threaded on the bolt) having conical bases. Thus tightening up on the nut to clamp the bolt also serves to draw the threads of the bolt more tightly into mesh with the gear part of the shaft, and also (if the lever hub is split) to contract and clamp the hub on the shaft. The depressions may, if desired, be eccentric with respect to the bore containing the bolt.

Whether or not arranged exactly as described above, this device is especially useful in adjustably mounting on the camshaft of a brake a novel brake-operating lever, and various important features of novelty relate to the modification of the brake parts to permit of such use.

The above and other features of novelty will be apparent from the following description of the illustrative embodiments shown in the accompanying drawing, in which:

Figure 1 is a vertical section through one front brake and through associated parts of the chassis;

Figure 2 is a view on an enlarged scale, substantially on the line 2—2 of Figure 1, through the camshaft and the hub of the lever, before tightening;

Figure 3 is a view corresponding to Figure 2, after tightening; and

Figure 4 is a view corresponding to Figure 3, but showing eccentric depressions.

The brake illustrated includes shoes 10 arranged to be forced by means such as a double cam 12 against a drum 14 carried by a front wheel 16. The wheel and drum are rotatably mounted on a knuckle 18 swivelled, as by the usual king pin, at one end of an axle 20. The open side of drum 14 is shown closed by a backing plate 22 carried by knuckle 18.

Cam 12 is secured to or (preferably) integral with a novel camshaft 24 journalled in a bracket 26 carried by the backing plate 22, and may have a flange 28 cooperating with the bracket 26 to confine laterally the free ends of shoes 10. The camshaft is rocked to apply the brake by an arm or lever 30 having a flattened end engaged by the ball end 32 of a lever 34 fulcrumed on axle 20. When the brake is applied, in the illustrated arrangement, the center of ball 32 is intended to be in or immediately adjacent the swivelling axis of wheel 16, so that the brake will not interfere with steering.

According to an important feature of the present invention, the hub of lever 30, which may be split at 36, is provided with two cross bores substantially at right angles to each other, and the lower of which embraces a gear part of shaft 24, here shown as a set of worm teeth 38 cut in the shaft itself. The upper bore is approximately tangent to and intersecting the bore for shaft 24, thus bridging split 36, and terminates in conical countersunk depressions 40.

Arranged in this tangent cross bore is an adjusting member such as a bolt 42, arranged with its threads forming a worm gear meshing with teeth 38. I prefer that bolt 42 should be considerably smaller in diameter than its cross bore, so that it is loose therein (see Figure 2) while it is being turned to adjust lever 30 on the shaft to adjust, with respect to the swivelling axis of wheel 16, the brake-applied position of the center of ball 32, to compensate for wear of the brake lining.

Novel means for drawing the bolt toward the shaft as it is tightened may take the form of parts, such as the bolt head 44 and a nut 46 threaded on the bolt, having conical bases seated in depressions 40. Thus when nut 46 is tightened up to hold the bolt, to preserve the adjustment, these parts serve to draw the bolt down tightly into mesh with gear part 38 as shown in Figure 3, and also, if the hub is split at 36, to contract the hub and clamp it on the shaft. This gives a very strong and tight joint between the lever and shaft.

As shown in Figure 4, the countersunk depressions may be eccentric with respect to their bore, having their axis nearer shaft 24 than the axis of the bore, so that when nut 46 is tightened it draws bolt 42 into the lower part of its bore.

The exact position of bolt 42 in its bore while the adjustment is being made, whether tilted as in Figure 2 or straight but in the upper part of the bore, will depend principally on how much nut 46 is loosened preparatory to making the adjustment, but in any case the conical bases of the head and of the nut will draw the bolt threads firmly against the shaft 24 when nut 46 is tightened again.

While illustrative embodiments of the invention have been described in detail, it is not my intention to limit its scope to those particular embodiments, or otherwise than by the terms of the appended claims.

I claim:

1. A cam having an integral shaft extending axially at one side and formed with gear teeth adjacent its end and not greater in diameter than said shaft, so that the shaft may be freely inserted into a bearing from the cam side.

2. A vehicle having a swivelled wheel with a brake, and comprising, in combination therewith, a brake-applying shaft swivelling with the wheel and having teeth at its end, an arm on the shaft, operating means engaging a part of the arm, the joint between said means and the arm being movable in applying the brake from an idle position spaced from the swivelling axis to an active position substantially in said axis, a member carried by said arm and meshing with said teeth and operable to turn the arm angularly on the shaft, and means to secure the arm on the shaft in any desired position of angular adjustment.

3. A vehicle having a swivelled wheel with a brake, and comprising, in combination therewith, a brake-applying shaft swivelling with the wheel, an arm on the shaft, a generally horizontal lever engaging a part of the arm, the joint between the lever and arm being movable in applying the brake from an idle position spaced from the swivelling axis to an active position substantially in said axis, the shaft having a worm thread adjacent the arm, and a member carried by the arm having a thread meshing with the thread on the shaft and operable to turn the arm on the shaft to adjust the active position of the joint with respect to the swivelling axis.

4. A vehicle having a swivelled wheel with a brake, and comprising, in combination therewith, a brake-applying shaft swivelling with the wheel, an arm on the shaft, a generally horizontal lever engaging a part of the arm, the joint between the lever and arm being movable in applying the brake from an idle position spaced from the swivelling axis to an active position substantially in said axis, the shaft having a worm thread adjacent the arm, a clamping bolt carried by a split hub of the arm and having a thread meshing with the thread on the shaft and operable to turn the arm on the shaft to adjust the active position of the joint with respect to the swivelling axis, and a nut on the clamping bolt to lock the split hub of said arm to the shaft with the arm in any desired adjusted angular position.

5. A brake comprising, in combination, a drum and backing plate, a friction device engageable with the drum, operating means for said device including a shaft passing through the backing plate and having a worm thread outside the backing plate, an arm having a split hub embracing the threaded part of the shaft, a bolt bridging the split in the hub and having a thread meshing with the thread of the shaft, the arm being adjustable angularly of the shaft by turning the bolt, and a nut on the bolt to lock the split hub on the shaft.

6. A brake comprising, in combination, a drum, a friction device engageable with the drum, operating means for said device including a shaft having a worm thread on its end, an arm having a hub embracing the threaded part of the shaft, a member rotatable in the hub and having a thread meshing with the thread of the shaft, the arm being adjustable angularly of the shaft by turning said member, and means to lock the arm on the shaft.

7. A brake comprising, in combination, a drum, a friction device engageable with the drum, a one-piece member having at one end a cam operating the friction device and having a shaft portion projecting therefrom formed with a gear part adjacent the other end, the gear part being not greater in diameter than said shaft, an operating lever on the shaft, and an adjusting member carried by the lever and meshing with said gear part.

8. A brake comprising, in combination, a drum, a backing plate, a friction device between the drum and plate having adjacent free ends, a shaft having a cam between said free ends, the cam having a flange engaging and holding laterally said free ends on the side opposite the backing plate, a bracket carried by the backing plate and in which the shaft is journalled and which engages and positions laterally said free ends on the side next the backing plate and an arm secured on the shaft on the opposite side of the backing plate from the cam, the cam and said arm restraining the shaft against axial movement in the bracket.

9. A cam and shaft including a cylindrical shaft portion having a worm thread near one end below the surface of the cylindrical portion, a cam portion at the other end of the shaft portion, and a flange at the extreme end of the cam portion away from the shaft portion.

10. A one-piece cam and shaft including a cylindrical shaft portion having a worm thread near one end, a cam portion at the other end of the shaft portion, in combination with an arm having a split hub encircling the threaded part of said shaft portion, and a clamping bolt for the split hub having a worm thread meshing with the thread of the shaft portion and rotatable to adjust the arm angularly on the shaft.

11. A lever mounting comprising, in combination, a shaft having a gear part, a lever having a split hub on the shaft encircling the gear part, a combination adjusting and clamping member carried by said hub and meshing with the gear part, and means engaging said member and said hub and having the double function of drawing said member against the gear part and of contracting the split hub to clamp the lever in adjusted position.

12. A lever mounting comprising, in combination, a shaft having a worm gear part, a lever having a split hub on the shaft encircling the gear part, a combination adjusting and clamping bolt carried by said hub and having threads meshing with the gear part, and means engaging said bolt and said hub and having the double function of drawing said bolt against the gear part and of contracting the split hub to clamp the lever in adjusted position.

13. A lever mounting comprising, in combination, a shaft having a gear part, a lever having a split hub on the shaft encircling the gear part, an adjusting member bridging the split in the hub and carried by the hub and meshing with said gear part, the hub having conical countersunk depressions encircling the ends of said member, and parts carried by the ends of said member and having conical bases seated in said depressions and one of which is threaded on said member to be tightened up to draw said member against the gear part and also to contract said split hub to clamp the lever on the shaft.

14. A lever mounting comprising, in combination, a shaft having a gear part, a lever having a hub on the shaft encircling the gear part, an adjusting member carried by the hub and meshing with said gear part, the hub having conical countersunk depressions encircling the ends of said member, and parts carried by the ends of said member and having conical bases seated in said depressions and one of which is threaded on said member to be tightened up to draw said member against the gear part and also to clamp the lever on the shaft.

15. A lever mounting comprising, in combination, a shaft having a worm gear part, a lever having a split hub on the shaft, the hub having two bores at right angles to each other and one of which is approximately tangent to and intersecting the other and which other embraces the gear part while the tangent bore crosses the split in the hub, a bolt in the tangent bore substantially smaller than the bore in diameter and having a thread meshing with the gear part, the hub having conical countersunk depressions at the ends of said tangent bore, and parts on the ends of the bolt having conical bases seated in the depressions and one of which is threaded on the bolt to be tightened up to draw the bolt against the gear part and also to contract the split hub.

16. A lever mounting comprising, in combination, a shaft having a worm gear part, a lever having a hub on the shaft, the hub having two bores at right angles to each other and one of which is approximately tangent to and intersecting the other and which other embraces the gear part, a bolt in the tangent bore substantially smaller than the bore in diameter and having a thread meshing with the gear part, the hub having conical countersunk depressions at the ends of said tangent bore, and parts on the ends of the bolt having conical bases seated in the depressions and one of which is threaded on the bolt to be tightened up to draw the bolt against the gear part.

17. A lever mounting comprising, in combination, a shaft having a worm gear part, a lever having a hub on the shaft, the hub having two bores at right angles to each other and one of which is approximately tangent to and intersecting the other and which other embraces the gear part, a bolt in the tangent bore substantially smaller than the bore in diameter and having a thread meshing with the gear part, the hub having conical countersunk depressions at the ends of said tangent bore, and parts on the ends of the bolt having conical bases seated in the depressions and one of which is threaded on the bolt to be tightened up to draw the bolt against the gear part, said depressions being eccentric with respect to the tangent bore and with their axis nearer the axis of the shaft than the axis of the tangent bore.

18. Operating mechanism comprising, in combination, a bearing, a shaft in the bearing having a cam at one end engaging the end of the bearing and preventing axial movement of the shaft in one direction, the opposite end of the shaft being formed with gear teeth, an operating device on said opposite end of the shaft, and an adjusting member meshing with said teeth and carried by the operating device and operable to turn the device angularly on the shaft and also serving to key said device to the shaft so that it will cause the device to cooperate with the bearing to prevent axial movement of the shaft in the opposite direction from the movement prevented by the cam.

19. Operating mechanism comprising, in combination, a bearing, a shaft in the bearing having a cam at one end engaging the end of the bearing and preventing axial movement of the shaft in one direction, the opposite end of the shaft being formed with a worm gear forming a groove around the shaft, an operating device on said opposite end of the shaft, and a worm meshing with said worm gear and carried by the operating device and operable to turn the device angularly on the shaft and seated in the groove to key said device to the shaft so that it will cause the device to cooperate with the bearing to prevent axial movement of the shaft in the opposite direction from the movement prevented by the cam.

In testimony whereof, I have hereunto signed my name.

VINCENT BENDIX.